(12) United States Patent
Ryan

(10) Patent No.: US 6,795,268 B1
(45) Date of Patent: Sep. 21, 2004

(54) DISK DRIVE EMPLOYING SEEK TIME VCM IR VOLTAGE CALIBRATION FOR VELOCITY CONTROL OF AN ACTUATOR ARM

(75) Inventor: Robert P. Ryan, Mission Viejo, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 236 days.

(21) Appl. No.: 09/704,195

(22) Filed: Oct. 31, 2000

(51) Int. Cl.⁷ .............................................. G11B 5/596
(52) U.S. Cl. ................... 360/78.04; 360/78.12
(58) Field of Search .......................... 360/78.12, 78.04, 360/78.09, 75; 318/615, 254

(56) References Cited

U.S. PATENT DOCUMENTS

| | | | | |
|---|---|---|---|---|
| 5,119,250 A | * | 6/1992 | Green et al. | 360/78.06 |
| 5,663,846 A | * | 9/1997 | Masuoka et al. | |
| 5,781,363 A | * | 7/1998 | Rowan et al. | 360/78.09 |
| 5,949,608 A | * | 9/1999 | Hunter | 360/78.09 |
| 5,982,130 A | * | 11/1999 | Male | 318/615 |
| 6,163,430 A | * | 12/2000 | Hansen | 360/78.06 |
| 6,229,663 B1 | * | 5/2001 | Yoneda et al. | 360/75 |

* cited by examiner

Primary Examiner—David Hudspeth
Assistant Examiner—K. Wong
(74) Attorney, Agent, or Firm—Milad G. Shara, Esq.; Howard H. Sheerin, Esq.

(57) ABSTRACT

A disk drive is disclosed comprising a disk, a head, an actuator arm for actuating the head radially over the disk during a seek operation, and a voice coil motor (VCM) for rotating the actuator arm about a pivot, the VCM comprising a coil comprising a VCM resistance R. A back EMF voltage detector measures a back EMF voltage across the coil, and a current detector detects a current I flowing through the coil. An IR voltage detector, responsive to the current I detected by the current detector, detects an IR voltage proportional to the current I times the VCM resistance R. A voltage compensator substantially cancels the IR voltage from the measured back EMF voltage to generate a compensated back EMF voltage. A control voltage generator, responsive the compensated back EMF voltage, generates a control voltage applied to the coil to generate the current I flowing through the coil. A memory stores a first compensated back EMF voltage generated at a first time period of the seek operation. A comparator compares the first compensated back EMF voltage stored in the memory to a second compensated back EMF voltage generated at a second time period of the seek operation. A calibrator, responsive to the comparator, calibrates the IR voltage detector.

18 Claims, 4 Drawing Sheets

DISK DRIVE EMPLOYING SEEK TIME VCM IR VOLTAGE CALIBRATION FOR VELOCITY CONTROL OF AN ACTUATOR ARM

CROSS REFERENCE TO RELATED APPLICATIONS AND PATENTS

This application is related to co-pending patent application Ser. No. 09/704,175 entitled "DISK DRIVE EMPLOYING VCM DEMAND CURRENT TO CALIBRATE VCM IR VOLTAGE FOR VELOCITY CONTROL OF AN ACTUATOR ARM", and Ser. No. 09/703,689 entitled "DISK DRIVE COMPRISING VCM STALL DETECTOR FOR VELOCITY CONTROL OF AN ACTUATOR ARM", both filed concurrently with the present application, the disclosures of which are incorporated herein by reference.

BACKGROUND OF THE INVENTION

1. Field of the Invention

The present invention relates to disk drives for computer systems. More particularly, the present invention relates to a disk drive employing seek time VCM IR voltage calibration for velocity control of an actuator arm.

2. Description of the Prior Art

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and embedded servo sectors. The embedded servo sectors comprise head positioning information (e.g., a track address) which is read by the head and processed by a servo control system to control the velocity of the actuator arm as it seeks from track to track.

There are times when the servo control system does not have access to the embedded servo sectors yet it is still desirable to control the velocity of the actuator arm. For example, in disk drives wherein the head is parked on a landing-zone of the disk, it is desirable to control the velocity of the actuator arm to unlatch the head during spin-up. In disk drives employing ramp loading/unloading, it is desirable to control the velocity of the actuator arm so that the head is not damaged as it travels off the ramp onto the disk as well as off the disk onto the ramp. Another example is if the servo control system loses servo sector synchronization it is desirable to control the velocity of the actuator arm to facilitate re-synchronizing to the servo sectors.

Prior art techniques for controlling the velocity of the actuator arm when servo sector information is unavailable include using a voltage loop with the detected back EMF generated by the VCM as the feedback. The VCM is essentially an RLC circuit where R is resistance, L inductance, and C the inertia of the motor and load. The voltage contribution of C to the measured back EMF is proportional to the velocity of the VCM. Since the resistance R is in series with C, it is desirable to cancel R's contribution to the back EMF leaving only LC. Once the resistance R is canceled, at low frequencies Ldi/dt is small leaving the voltage contribution of C as the dominant factor in the measured back EMF.

Prior art techniques for performing VCM resistance compensation include calibrating and subtracting from the measured back EMF the voltage contribution of R (i.e., the IR voltage where I is the current in the VCM). The VCM resistance R is measured by applying a fixed current to the VCM in order to press the actuator arm against a fixed object (e.g., the crash-stop for stopping the head at the inner diameter (ID)). With the actuator arm pressed against the fixed object, the velocity is zero and Ldi/dt is zero, leaving the VCM resistance R as the only contribution to the measured back EMF. However, the calibrated R value is only valid for a few seconds since the VCM resistance R can fluctuate significantly with temperature. If the VCM cools down, the IR voltage can become negative resulting in instability and damage. If the VCM heats up, the IR voltage can mask the velocity measurement (the voltage contribution of C), resulting in a failure to load or unload. Thus, it would be necessary to move the actuator arm to the fixed object every few seconds to perform the above calibration procedure to update the estimate for the VCM resistance R. This problem can be alleviated by using higher performance VCMs (e.g., VCMs with a higher Km); however, this increases the cost of the disk drive.

There is, therefore, a need to reduce the cost of a disk drive by employing a less expensive VCM, and to improve performance by calibrating the VCM IR voltage to enable velocity control of an actuator arm without having to periodically move the actuator arm to a fixed object.

SUMMARY OF THE INVENTION

The present invention may be regarded as a disk drive comprising a disk, a head, an actuator arm for actuating the head radially over the disk during a seek operation, and a voice coil motor (VCM) for rotating the actuator arm about a pivot, the VCM comprising a coil comprising a VCM resistance R. A back EMF voltage detector measures a back EMF voltage across the coil, and a current detector detects a current I flowing through the coil. An IR voltage detector, responsive to the current I detected by the current detector, detects an IR voltage proportional to the current I times the VCM resistance R. A voltage compensator substantially cancels the IR voltage from the measured back EMF voltage to generate a compensated back EMF voltage. A control voltage generator, responsive the compensated back EMF voltage, generates a control voltage applied to the coil to generate the current I flowing through the coil. A memory stores a first compensated back EMF voltage generated at a first time period of the seek operation. A comparator compares the first compensated back EMF voltage stored in the memory to a second compensated back EMF voltage generated at a second time period of the seek operation. A calibrator, responsive to the comparator, calibrates the IR voltage detector.

In one embodiment, the disk drive further comprises a current integrator for integrating the current I detected by the current detector between the first and second time periods, wherein the second time period occurs when the integrated current I crosses zero. In another embodiment, the memory comprises a capacitor. In an alternative embodiment, the memory comprises an analog-to-digital converter and a register. In yet another embodiment, the comparator comprises an analog-to-digital converter.

The present invention may also be regarded as a method of controlling velocity of an actuator arm in a disk drive. The disk drive comprises a disk, a head, the actuator arm, and a voice coil motor (VCM) for rotating the actuator arm about a pivot. The VCM comprises a coil comprising a VCM resistance R. A control voltage is generated from a command input and a compensated back EMF voltage. The control voltage is applied to the coil to generate a current I flowing through the coil to move the actuator arm during a seek operation. A back EMF voltage across the coil, a current I flowing through the coil, and an IR voltage proportional to the current I times the VCM resistance R, are detected. The IR voltage is subtracted from the back EMF voltage detected across the coil to generate the compensated back EMF voltage. During a first time period of the seek operation, a first compensated back EMF voltage is generated and stored in a memory. During a second time period of the seek operation, a second compensated back EMF voltage is generated. The first compensated back EMF voltage stored in the memory is compared to the second back EMF voltage, and the result of the comparison is used to calibrate the detected IR voltage.

DESCRIPTION OF THE PREFERRED EMBODIMENTS

Figure 1:
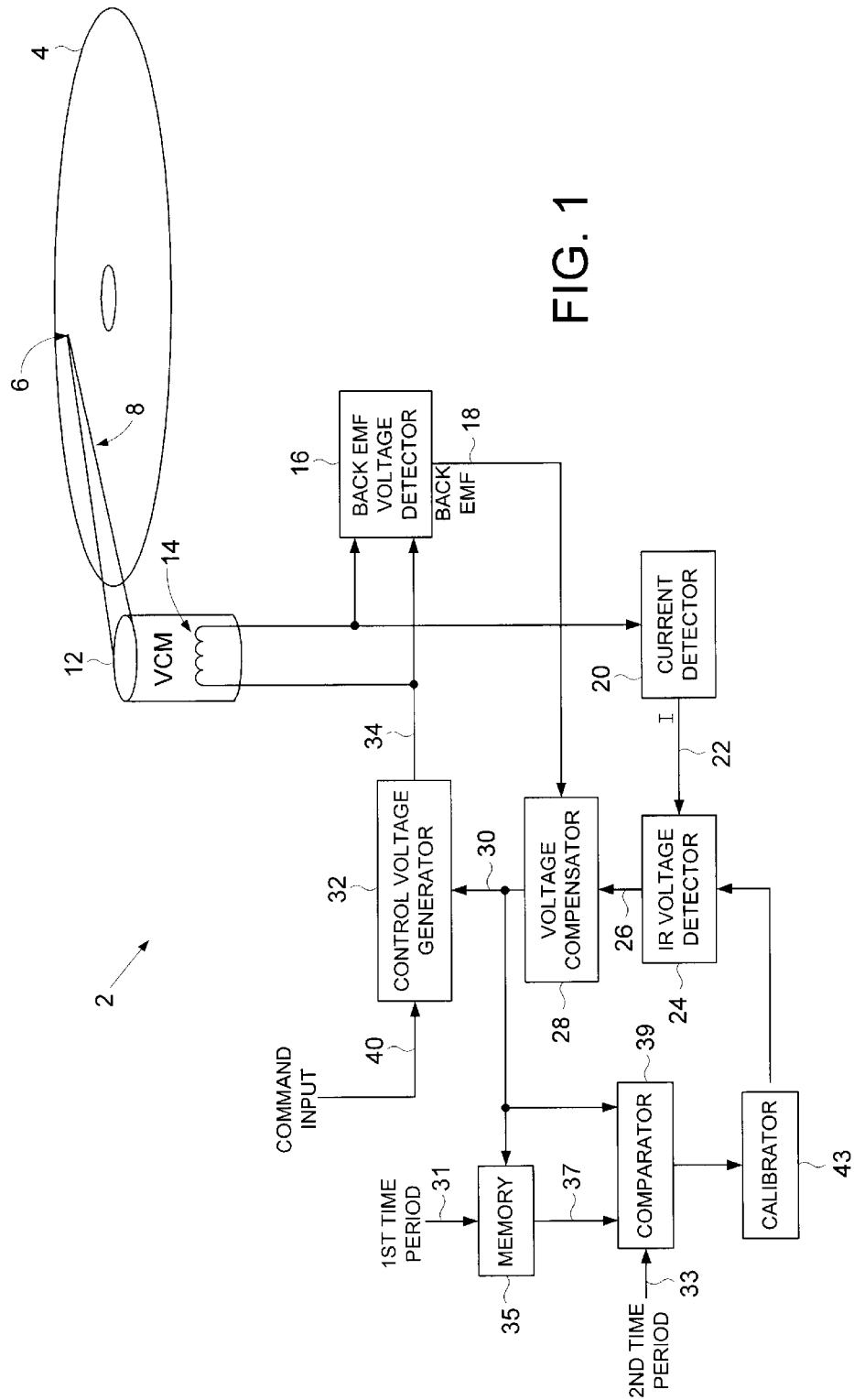
FIG. 1 shows a disk drive according to an embodiment of the present invention as comprising a back EMF voltage detector, an IR voltage detector, a voltage calibrator for calibrating the IR voltage detector, and a voltage compensator for substantially canceling the IR voltage from the back EMF voltage measurement.

FIG. 1 shows a disk drive 2 according to an embodiment of the present invention as comprising a disk 4, a head 6, an actuator arm 8 for actuating the head 6 radially over the disk 4 during a seek operation, and a voice coil motor (VCM) 12 for rotating the actuator arm 8 about a pivot, the VCM 12 comprising a coil 14 comprising a VCM resistance R. A back EMF voltage detector 16 measures a back EMF voltage 18 across the coil 14, and a current detector 20 detects a current I 22 flowing through the coil 14. An IR voltage detector 24, responsive to the current I 22 detected by the current detector 20, detects an IR voltage 26 proportional to the current I 22 times the VCM resistance R. A voltage compensator 28 substantially cancels the IR voltage 26 from the measured back EMF voltage 18 to generate a compensated back EMF voltage 30. A control voltage generator 32, responsive the compensated back EMF voltage 30, generates a control voltage 34 applied to the coil 14 to generate the current I 22 flowing through the coil 14. A memory 35 stores a first compensated back EMF voltage 30 at a first time period 31 of the seek operation. A comparator 39 compares the first compensated back EMF voltage 37 stored in the memory 35 to a second compensated the back EMF voltage 30 generated at a second time period 33 of the seek operation. A calibrator 43, responsive to the comparator 39, calibrates the IR voltage detector 24.

In the embodiment of FIG. 1, a command input 40 is generated by a servo control system (not shown) which controls the desired radial position of the head 6 with respect to the tracks recorded on the disk 4. When calibrating the IR voltage detector 24, the servo control system generates the appropriate command input 40 to effectuate a seek operation. The seek operation may be performed during normal operation of the disk drive, or during a designated calibration period if the disk drive has not performed a seek within a predetermined interval.

Integrating the current I 22 during the seek operation provides an estimate of the velocity of the actuator arm 8. As the integration is performed during the acceleration and deceleration period of the seek operation, the integration rises and falls with velocity. If the integration is started during the acceleration period at a first velocity, when the integration crosses zero during deceleration the velocity at that time will equal the first velocity. Thus, sampling and storing the compensated back EMF voltage 30 at the start of the integration, and then comparing the stored back EMF voltage to the compensated back EMF voltage 30 when the integration crosses zero, provides an estimate of the error in the calibrated IR voltage detector 24. This error is used to adjust the IR voltage detector 24 to account for changes in the VCM resistance R due, for example, to temperature fluctuations.

Figure 2:
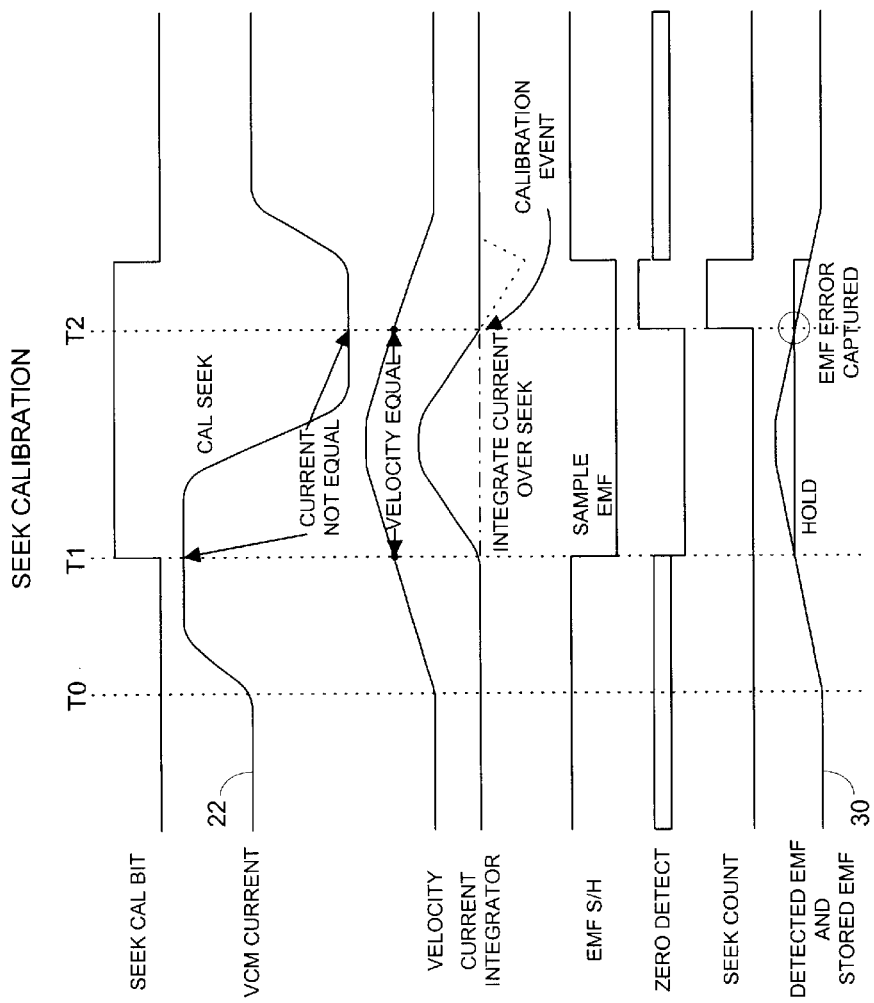
FIG. 2 is a timing diagram illustrating how the IR voltage detector is calibrated during a seek operation.

The seek calibration technique is better understood with reference to FIG. 2 which shows a timing diagram for various signals in the disk drive during a calibration seek operation. At time T0 the VCM current 22 is ramped positively to accelerate the actuator arm 8. When the actuator arm reaches a predetermined velocity at time T1, the calibration process begins by sampling and storing a first compensated back EMF voltage 30 and starting the integration of the VCM current I 22. When the integration of the VCM current I 22 crosses zero at time T2, the first compensated back EMF voltage is compared to a second compensated back EMF voltage 30 generated at time T2. The result of the comparison (the error) is then used to adjust the IR voltage detector 24.

Figure 3:
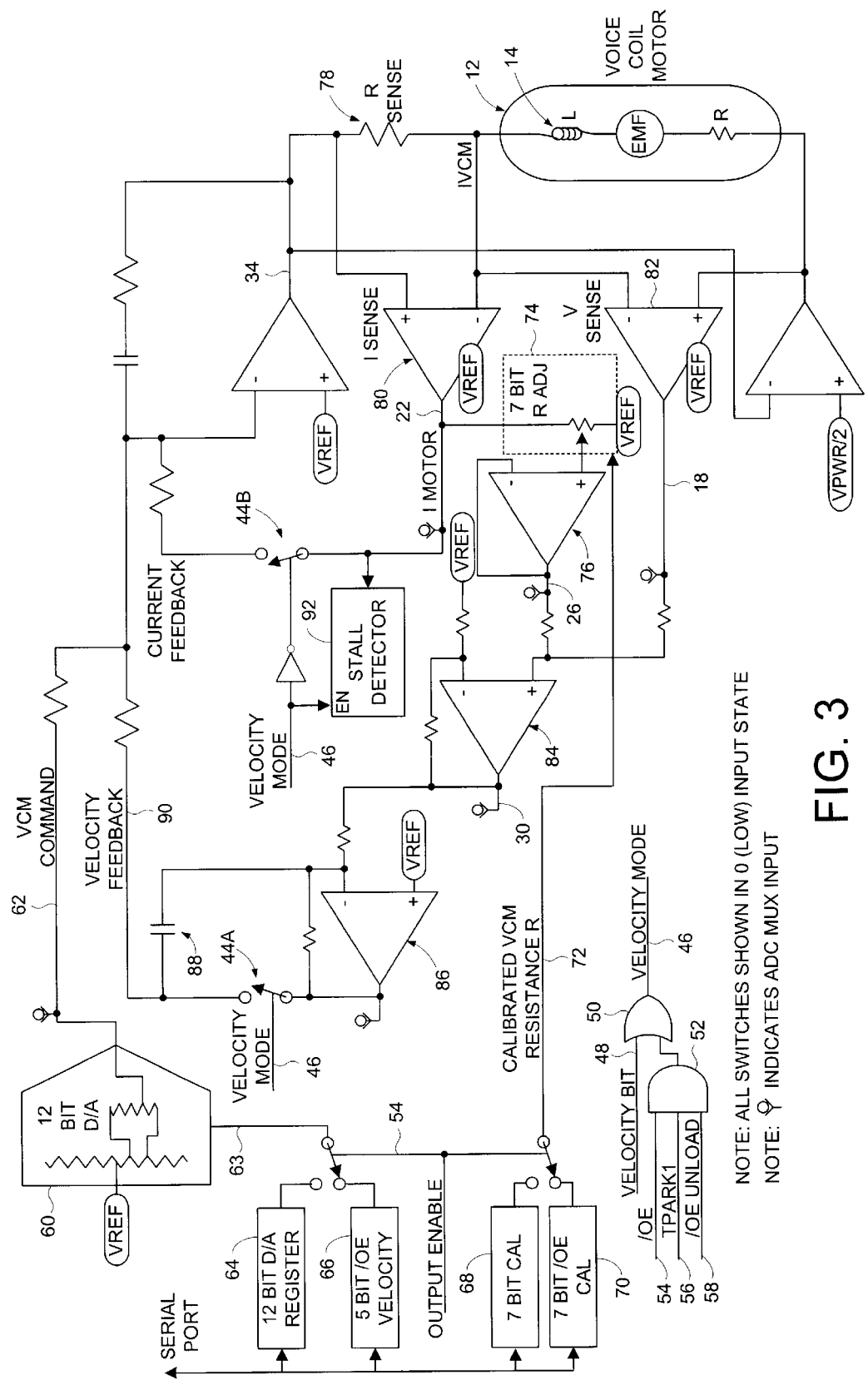
FIG. 3 shows suitable circuitry for implementing the components in the disk drive shown in FIG. 1.

FIG. 3 shows suitable circuitry for implementing the control voltage generator 32, back EMF voltage detector 16, current detector 20, IR voltage detector 24, and voltage compensator 28 of FIG. 1. Other circuitry, firmware, or combinations thereof may be employed in alternative embodiments. The circuit of FIG. 3 operates in a normal operating mode wherein the VCM 12 is driven by a current controlled feedback loop, and in a velocity control mode wherein the VCM 12 is driven by a voltage controlled feedback loop. When in the normal operating mode, switch 44A is opened and switched 44B is closed to configure the current feedback loop, and when in the velocity control mode, switch 44A is closed and switch 44B is opened to configure the voltage feedback loop. A velocity mode control signal 46 configures the switches 44A and 44B for velocity control mode when the embedded servo information is not available for servo controlling the velocity of the actuator arm 8. A velocity bit 48 may be set by a controller (e.g., a servo controller) to activate the velocity mode control signal 46 via OR gate 50. The velocity bit 48 may be set during controlled modes of operation, such as during a load/unload operation or when synchronization to the embedded servo data is lost. The velocity mode control signal 46 may also be activated via AND gate 52 and OR gate 50 during power down or power failure. If the OE UNLOAD signal 58 has been preset to configure the drive for velocity mode unload, when a power down or power failure is detected, the control signals OUTPUT ENABLE (OE) 54 and TPARK1 56 are automatically activated, thereby activating the velocity mode control signal 46.

A digital-to-analog (D/A) converter 60 generates an analog VCM command signal 62 in response to a digital command input signal 63. A digital register 64 is programmed with an operating command input during normal operation, and a digital register 66 is programmed with a velocity mode command input used during power down or power failure to park the head 6. A digital register 68 stores a calibrated VCM resistance R value 72 for use during velocity control mode when the velocity bit 48 is activated (e.g., when calibrating the detected IR voltage 26). After calibrating the detected IR voltage 26 a digital register 70 stores the calibrated VCM resistance R value 72 for use during power down or power failure.

The VCM resistance R value 72 adjusts a programmable resistor 74 to vary a resistance associated with an input voltage to an amplifier 76. A sense resistor 78 and amplifier 80 implement a suitable current detector 20 for generating a voltage representing the current I 22 flowing through the coil 14. With the voltage representing the current I 22 applied to the programmable resistor 74, the output of amplifier 76 is the calibrated IR voltage 26. An amplifier 82 measures the back EMF voltage 18 across the coil 14. The IR voltage 26 is subtracted from the measured back EMF voltage 18 such that the output voltage of amplifier 84 is the compensated back EMF voltage 30. The compensated back EMF voltage 30 is amplified by amplifier 84, and filtered by amplifier 86 and capacitor 88 to generate a velocity feed back voltage 90 representative of the velocity of the actuator arm 8. The velocity feedback voltage 90 is subtracted from the VCM command signal 62 to generate the control voltage 34 applied to the coil 14.

A stall detector 92 monitors the current I 22 flowing through the coil 14 to detect when the VCM 12 has stalled. For further details concerning the stall detector 92, see the above referenced patent application entitled "DISK DRIVE COMPRISING VCM STALL DETECTOR FOR VELOCITY CONTROL OF AN ACTUATOR ARM." The stall detector 92 is also advantageously used to calibrate the IR voltage detector 24 using an alternative technique disclosed in the above referenced patent application entitled "DISK DRIVE EMPLOYING VCM DEMAND CURRENT TO CALIBRATE VCM IR VOLTAGE FOR VELOCITY CONTROL OF AN ACTUATOR ARM."

Figure 4:
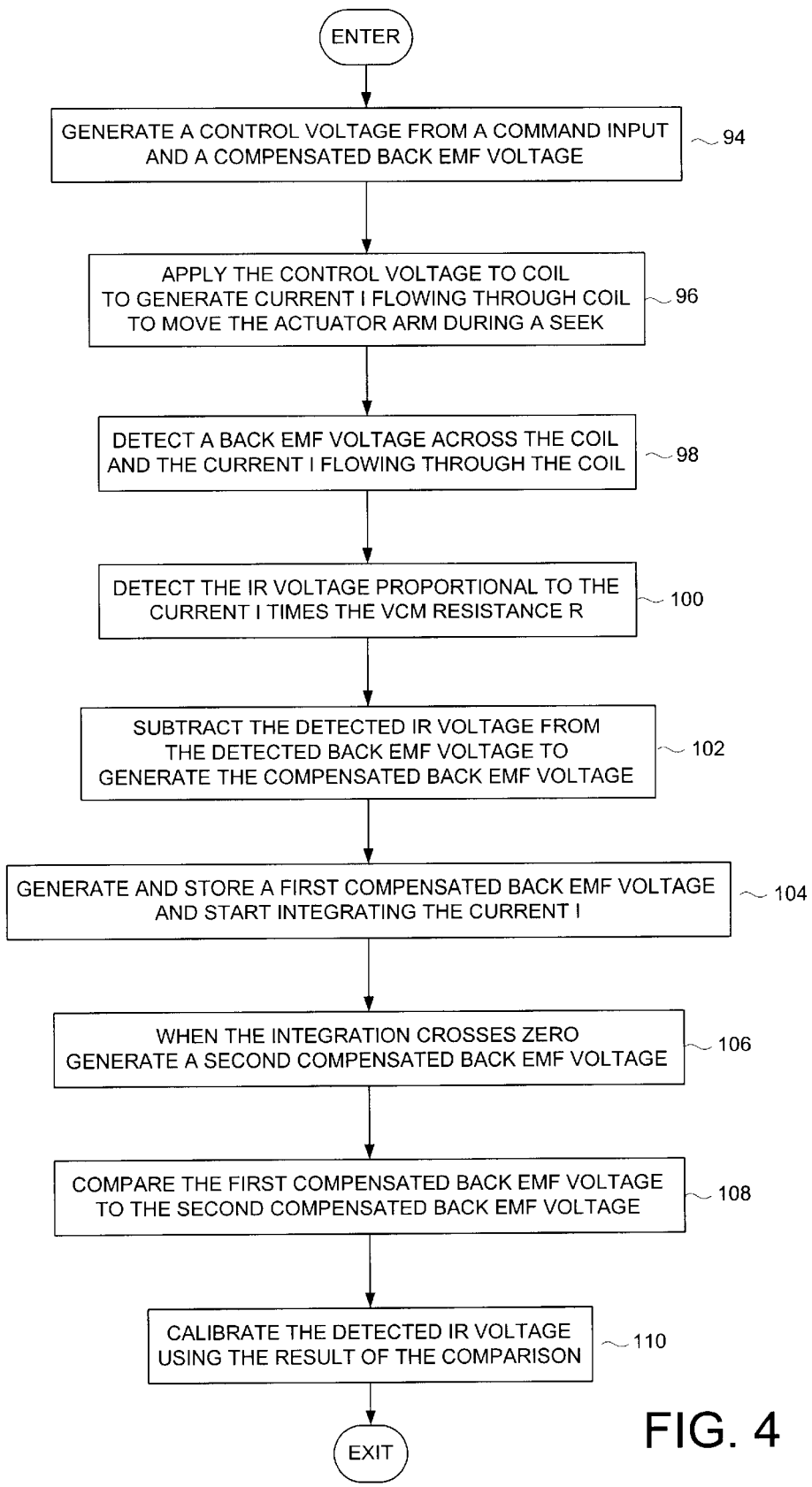
FIG. 4 is a flow diagram illustrating a method for controlling the velocity of the actuator arm according to an embodiment of the present invention.

FIG. 4 shows a flow diagram for calibrating the IR voltage detector 24 according to an embodiment of the present invention. At step 94, a control voltage 34 is generated from a command input 40 and a compensated back EMF voltage 30. At step 96, the control voltage 34 is applied to the coil 14 to generate a current I 22 flowing through the coil 14 to move the actuator 8 during a seek operation. A back EMF voltage 18 across the coil 14 and the current I 22 flowing through the coil 14 are detected at step 98. An IR voltage 26 is detected at step 100 proportional to the current I 22 times the VCM resistance R. At step 102 the detected IR voltage 26 is subtracted from the detected back EMF voltage 18 to generate the compensated back EMF voltage 30. At step 104 a first compensated back EMF voltage 30 is generated and stored in a memory 35 and an integration of the current I 22 is started. When the integration crosses zero at step 106, a second compensated back EMF voltage 30 is generated. At step 108 the first compensated back EMF voltage is compared to the second compensated back EMF voltage, and at step 110 the result of the comparison (the error) is used to calibrate the detected IR voltage 26.

In the embodiment of FIG. 3, various signals are tapped and sampled by an analog-to-digital converter (not shown). During the calibration process, the compensated back EMF voltage 30 (at the output of amplifier 84) is sampled by the analog-to-digital converter to generate the first and second compensated back EMF voltages. The first compensated back EMF voltage is stored in a register, and the comparison of the first and second compensated back EMF voltages is performed by a controller (e.g., a servo controller). In another embodiment, the memory for storing the first compensated back EMF voltage comprises a sample-and-hold circuit wherein the "hold" is a capacitor. The comparison of the first and second compensated back EMF voltages is performed in the analog domain using an analog comparator.

If seeks of sufficient length are performed frequently enough during the normal operation of the disk drive 2, the IR voltage detector 24 will remain calibrated so that the velocity mode can be entered at any time to perform such operation as standard unload, resynchronize to servo sectors, or power down emergency unload. This allows the use of less expensive VCMs while avoiding the performance degradation associated with periodically seeking the actuator arm to a fixed object. If a seek of sufficient length is not performed for several seconds during the normal operation of the disk drive, a calibration seek is performed in order to calibrate the IR voltage detector 24. A suitable timing operation is implemented in hardware or firmware to monitor the interval between seek calibrations and to initiate a seek calibration if the interval exceeds a predetermined threshold.

I claim:
1. A disk drive comprising:
  (a) a disk;
  (b) a head;
  (c) an actuator arm for actuating the head radially over the disk during a seek operation;
  (d) a voice coil motor (VCM) for rotating the actuator arm about a pivot, the VCM comprising a coil comprising a VCM resistance R;
  (e) a back EMF voltage detector for measuring a back EMF voltage across the coil;
  (f) a current detector for detecting a current I flowing through the coil;
  (g) an IR voltage detector, responsive to the current I detected by the current detector, for detecting an IR voltage proportional to the current I times the VCM resistance R;
  (h) a voltage compensator for substantially canceling the IR voltage from the measured back EMF voltage to generate a compensated back EMF voltage;
  (i) a control voltage generator, responsive the compensated back EMF voltage, for generating a control voltage applied to the coil to generate the current I flowing through the coil;
  (j) a memory for storing a first compensated back EMF voltage generated at a first time period of the seek operation;
  (k) a current integrator for integrating the current I detected by the current detector from the first time period to a second time period of the seek operation, wherein the second time period occurs when the integration crosses zero;
  (l) a comparator for comparing the first compensated back EMF voltage stored in the memory to a second compensated back EMF voltage generated at the second time period of the seek operation; and
  (m) a calibrator, responsive to the comparator, for calibrating the IR voltage detector.

2. The disk drive as recited in claim 1, wherein the memory comprises a capacitor.

3. The disk drive as recited in claim 1, wherein the memory comprises an analog-to-digital converter and a register.

4. The disk drive as recited in claim 1, wherein the comparator comprises an analog-to-digital converter.

5. A method of controlling velocity of an actuator arm in a disk drive, the disk drive comprising a disk, a head, the actuator arm, and a voice coil motor (VCM) for rotating the actuator arm about a pivot, the VCM comprising a coil comprising a VCM resistance R, the method comprising the steps of:

(a) generating a control voltage from a command input and a compensated back EMF voltage;

(b) applying the control voltage to the coil to generate a current I flowing through the coil to move the actuator arm during a seek operation;

(c) detecting a back EMF voltage across the coil;

(d) detecting the current I flowing through the coil;

(e) detecting an IR voltage proportional to the current I times the VCM resistance R;

(f) subtracting the IR voltage from the detected back EMF voltage to generate the compensated back EMF voltage;

(g) at a first time period of the seek operation generating a first compensated back EMF voltage and storing the first compensated back EMF voltage in a memory;

(h) integrating the current I flowing through the coil from the first time period to a second time period of the seek operation, wherein the second time period occurs when the integration crosses zero;

(i) at the second time period of the seek operation, generating a second compensated back EMF voltage;

(j) comparing the first compensated back EMF voltage stored in the memory to the second compensated back EMF voltage; and (k) calibrating the detected IR voltage in response to the comparison.

6. The method of controlling velocity of an actuator arm as recited in claim 5, wherein the memory comprises a capacitor.

7. The method of controlling velocity of an actuator arm as recited in claim 5, further comprising the step of converting the compensated back EMF voltage into a digital value.

8. The method of controlling velocity of an actuator arm as recited in claim 7, wherein the step of comparing comprises the step of comparing a first digital value representing the first compensated back EMF voltage stored in the memory at the first time period to a second digital value representing the second compensated back EMF voltage generated at the second time period.

9. A disk drive comprising:

(a) a disk;

(b) a head;

(c) an actuator arm for actuating the head radially over the disk during a seek operation;

(d) a voice coil motor (VCM) for rotating the actuator arm about a pivot, the VCM comprising a coil comprising a VCM resistance R;

(e) a back EMF voltage detector for measuring a back EMF voltage across the coil;

(f) a current detector for detecting a current I flowing through the coil;

(g) an IR voltage detector, responsive to the current I detected by the current detector, for detecting an IR voltage proportional to the current I times the VCM resistance R;

(h) a voltage compensator for substantially canceling the IR voltage from the measured back EMF voltage to generate a compensated back EMF voltage;

(i) a control voltage generator, responsive the compensated back EMF voltage, for generating a control voltage applied to the coil to generate the current I flowing through the coil;

(j) a memory for storing a first compensated back EMF voltage generated at a first time period of the seek operation while the VCM is accelerating;

(k) a comparator for comparing the first compensated back EMF voltage stored in the memory to a second compensated back EMF voltage generated at a second time period of the seek operation while the VCM is decelerating; and (l) a calibrator, responsive to the comparator, for calibrating the IR voltage detector.

10. The disk drive as recited in claim 9, wherein:

(a) the disk drive further comprises a current integrator for integrating the current I detected by the current detector between the first and second time period; and (b) the second time period occurs when the integration of the current I crosses zero.

11. The disk drive as recited in claim 9, wherein the memory comprises a capacitor.

12. The disk drive as recited in claim 9, wherein the memory comprises an analog-to-digital converter and a register.

13. The disk drive as recited in claim 9, wherein the comparator comprises an analog-to-digital converter.

14. A method of controlling velocity of an actuator arm in a disk drive, the disk drive comprising a disk, a head, the actuator arm, and a voice coil motor (VCM) for rotating the actuator arm about a pivot, the VCM comprising a coil comprising a VCM resistance R, the method comprising the steps of:

(a) generating a control voltage from a command input and a compensated back EMF voltage;

(b) applying the control voltage to the coil to generate a current I flowing through the coil to move the actuator arm during a seek operation;

(c) detecting a back EMF voltage across the coil;

(d) detecting the current I flowing through the coil;

(e) detecting an IR voltage proportional to the current I times the VCM resistance R;

(f) subtracting the IR voltage from the detected back EMF voltage to generate the compensated back EMF voltage;

(g) at a first time period of the seek operation while the VCM is accelerating, generating a first compensated back EMF voltage and storing the first compensated back EMF voltage in a memory;

(h) at a second time period of the seek operation while the VCM is decelerating, generating a second compensated back EMF voltage;

(i) comparing the first compensated back EMF voltage stored in the memory to the second compensated back EMF voltage; and (j) calibrating the detected IR voltage in response to the comparison.

15. The method of controlling velocity of an actuator arm as recited in claim 14, further comprising the step of integrating the current I between the first and second time period, wherein the second time period occurs when the integration crosses zero.

16. The method of controlling velocity of an actuator arm as recited in claim 14, wherein the memory comprises a capacitor.

17. The method of controlling velocity of an actuator arm as recited in claim 14, further comprising the step of converting the compensated back EMF voltage into a digital value.

18. The method of controlling velocity of an actuator arm as recited in claim 17, wherein the step of comparing comprises the step of comparing a first digital value representing the first compensated back EMF voltage stored in the memory at the first time period to a second digital value representing the second compensated back EMF voltage generated at the second time period.

* * * * *